Patented Aug. 15, 1933

1,923,055

UNITED STATES PATENT OFFICE 1,923,055

ALDEHYDEAMINE CINCHONA BARK ALKALOID INHIBITORS

Ralph E. Lawrence, Wickliffe, Ohio, assignor to The Grasselli Chemical Company, Cleveland, Ohio, a Corporation of Delaware No Drawing. Application December 19, 1931
Serial No. 582,187

4 Claims. (Cl. 148—8)

The invention relates to novel substances useful for the control of the action of acids upon metals in pickling and other metal cleaning operations.

It is known through U. S. Patent No. 1,742,986, H. P. Corson, January 7, 1930, that cinchona bark alkaloids have the properties of inhibiting the action of acids upon metals and U. S. Patent No. 1,719,649, G. D. Chamberlain, July 2, 1929, discloses that aldehydeamines have these same properties.

I have found that by reacting with cinchona bark alkaloids upon aldehydeamines, new condensation products are obtained which have to a greatly enhanced degree, the property of inhibiting the action of acids upon metals and my invention comprises the novel condensation products obtained by heating to temperatures above about 100° C. an aldehydeamine and a cinchona bark alkaloid and their application to processes of cleaning or pickling metal articles involving the action of dilute, non-oxidizing acids upon metal articles.

Aldehydeamines have been produced from various aliphatic and aromatic amines condensed with aliphatic and in a few instances aromatic aldehydes. They are known in various molecular ratios of aldehyde to amine. The primary, direct reaction products are further known to react with further amounts of amine or with sulfur and hydrogen sulfid to produce substances of properties somewhat similar to those of the primary products. Very few aldehydeamines have been obtained in crystalline form and their chemical constitution is in most instances undetermined. These aldehydeamines have both chemically and physically very similar properties and a majority of them are known to accelerate the sulfur vulcanization of rubber.

Cinchona bark contains a number of alkaloids of which quinine, quinidine, cinchonine for instance are obtained and used in the medical arts. After extracting these important, crystalline products from the crude alkaloid mixture contained in the bark, there is left an amorphous complicated mixture of substances of alkaloidal character which is known as quinoidine.

I produce my novel inhibitors by heating together an aldehydeamine chosen from the large number of substances comprising this family of chemical substances and a cinchona bark alkaloid, either one of the known crystalline alkaloids or the raw or by-product complex mixture of these products.

In view of the complex nature of the components used to prepare my novel condensation products, I have been unable to develop any theory as to the formation of my novel inhibitors or to establish their chemical constitution. Even when using relatively small but substantial amounts, say for instance 10% of the total, of an aldehydeamine and heating it with for instance quinoidine, I obtain condensation products which show a marked increase in inhibiting efficiency over the alkaloid used alone or in mere physical admixture with the aldehydeamine. Different proportions of the components up to equal weights give likewise on heating condensation products of marked inhibiting efficiency. Excellent results have, for instance, been obtained with condensation products from 25 parts aldehydeamine and 75 parts quinoidine or other cinchona bark alkaloid.

The similarity of chemical properties of aldehydeamines is also shown in my novel reaction. I have condensed various aldehydeamines with cinchona bark alkaloids and in all instances obtained inhibitors of efficient inhibiting properties. The selection of the raw materials for producing practically useful inhibitors is, therefore, entirely dependent upon economical considerations and condensation products of acetaldehydeaniline with quinoidine are not only easily available but have an efficiency of over 95%, when comparing pickling baths without or with the addition of even less than for instance 0.1% of the condensation product.

The condensation is effected by heating the mixture of the components to above 100° C. when an exothermic reaction takes place. The melt is kept for a short time between about 130 to 140° C. On cooling, a solid dark, resinous mass is obtained which can be used directly.

The resinous, yellowish to brown colored condensation products are easily and nearly completely soluble in dilute sulfuric or other acid, seemingly without decomposition and this easy solubility is a great advantage in pickling and cleaning operations.

Dilute, non-oxidizing acids, such as sulfuric, hydrochloric, phosphoric, acetic, formic are commonly used in pickling and metal cleaning operations. Dissolving small amounts, for instance, from 0.05 to 0.5% or even less, of my novel condensation products in such acids, produces cleaning baths which are as efficient in removing oxides, scale or other impurities from metallic surfaces as the straight acids, without, however, unduly attacking the bare metal, as is the case with straight acids.

My novel inhibitors can be used in conjunction with other common addition agents used in metal cleaning baths without interference between the actions of the various ingredients.

I claim:

1. A cleaning and pickling bath for metals comprising a dilute, non-oxidizing acid containing a small amount of the condensation product obtained by heating together an acetaldehydeaniline and quinoidine.

2. In a process of cleaning and pickling metal articles, the step which comprises treating said articles with a dilute, non-oxidizing acid containing a small amount of the condensation product obtained by heating together an acetaldehydeaniline and quinoidine.

3. A cleaning and pickling bath for metals comprising a dilute, non-oxidizing acid containing a small amount of the condensation product obtained by heating together an aldehydeamine and a cinchona bark alkaloid.

4. In a process of cleaning and pickling metal articles, the step which comprises treating said articles with a dilute, non-oxidizing acid containing a small amount of the condensation product obtained by heating together an aldehydeamine and a cinchona bark alkaloid.

RALPH E. LAWRENCE.